(12) United States Patent
Endress et al.

(10) Patent No.: US 6,895,554 B2
(45) Date of Patent: May 17, 2005

(54) METHOD OF DOCUMENT ASSEMBLY

(75) Inventors: Matthew Paul Endress, Harrisburg, PA (US); Kenneth S. Thompson, Camp Hill, PA (US)

(73) Assignee: DataTech Software, Inc., Harrisburg, PA (US)

( * ) Notice: Subject to any disclaimer, the term of this patent is extended or adjusted under 35 U.S.C. 154(b) by 725 days.

(21) Appl. No.: 09/875,829

(22) Filed: Jun. 6, 2001

(65) Prior Publication Data

US 2002/0055945 A1 May 9, 2002

Related U.S. Application Data

(60) Provisional application No. 60/209,829, filed on Jun. 6, 2000.

(51) Int. Cl.$^7$ .............................................. G06F 17/22
(52) U.S. Cl. ....................................... 715/530; 715/522
(58) Field of Search ................................ 715/530, 522, 715/511, 534; 707/102

(56) References Cited

U.S. PATENT DOCUMENTS

| | | | | |
|---|---|---|---|---|
| 5,222,236 A | * | 6/1993 | Potash et al. | 707/102 |
| 5,729,751 A | * | 3/1998 | Schoolcraft | 715/530 |
| 6,547,831 B1 | * | 4/2003 | Kueny | 715/522 |

* cited by examiner

*Primary Examiner*—Sanjiv Shah
(74) *Attorney, Agent, or Firm*—Webb Ziesenheim Logsdon Orkin & Hanson P.C.

(57) ABSTRACT

A method of document assembly includes initializing or opening in a memory of a computer a document having at least one live data field. For each live data field opened in the memory, a record is also is initialized in the memory. Each record stores an attribute or property of data received in the corresponding live data field. Data is inserted into a first live data field or data in the first live data field is amended. Data is inserted into a second live data field or data in the second live data field is amended to include the data inserted into or amended in the first live data field based upon the attributes or property of the data stored in the records of the first and second live data fields.

4 Claims, 9 Drawing Sheets

MICROSOFT WORD-AGREEMENT NAMING BENEFICIARIES FOR COMPENSATION

FILE EDIT VIEW INSERT FORMAT TOOLS TABLE THINKSDOCS WINDOW HELP

ON THIS DAY, (DATE OF AGREEMENT MM-DD-YY), I DECLARE THAT I AM MARRIED TO [INSERT] AND THAT WE INSERT CHILDREN, NAMELY INSERT.

THROUGHOUT THIS AGREEMENT, THE TERM "SPOUSE" SHALL MEAN MY INSERT.

THE TERM "CHILDREN" AS USED HEREIN SHALL INCLUDE MY AFORESAID CHILDREN AND ANY CHILD BORN TO OR ADOPTED BY ME HEREAFTER.

OPTION 1

I DECLARE THAT I HAVE INSERT CHILDREN NAMELY INSERT.

FIG. 3

METHOD OF DOCUMENT ASSEMBLY

CROSS REFERENCE TO RELATED APPLICATIONS

This application claims priority from United States Provisional Patent Application Ser. No. 60/209,829, filed Jun. 6, 2000, entitled "Method of Document Assembly".

BACKGROUND OF THE INVENTION

In a conventional word processor, once data is entered into a document, the data becomes a word or symbol without an attribute or property. For example, if the group of words "John Smith" is entered into a document being created with a conventional word processor, the group of words loses its attribute or property as a proper name to the word processor. This is so because the word processor cannot distinguish between "John Smith" as a proper name and "John Smith" as a group of words. It is this inability of the word processor that makes it necessary for the word processor to utilize the well known "search" or "search-and-replace" functions to find and/or replace each occurrence of a specific word or group of words in a single document. Moreover, if it is desired to find and/or replace a specific word or group of words in one or more related documents, it would be necessary using the word processor to open each related document containing an occurrence of the word or group of words and use the "search-and-replace" function to effect the change within each document.

It is, therefore, an object of the present invention to overcome the above problem and others by enabling one or more attributes or properties to be selectively assigned to one or more fields in a word processing document and then utilize these one or more properties to effect changes to data received in the one or more fields within a document or among related documents based on these one or more attributes or properties. Still other objects will become apparent to those of ordinary skill in the art upon reading and understanding the following detailed description.

SUMMARY OF THE INVENTION

Accordingly, we have invented a method of document assembly that includes associating one or more live data fields of a word processing document with data received in a database so that when the document is opened, each live field receives from the database data associated with the live data field. Once data is received in a live data field of a document, any changes to the data in the live data field will be reflected in each instance of the live data field throughout the document. Moreover, if data is changed in a live data field of one document, instances of the live data field in other, related documents are automatically updated with the changed data when the other documents are opened.

More specifically, data is tracked within a document and between documents by assigning a globally unique key to each live data field as it is created. When a live data field is used in a document, a reference to the key of the live data field is included in a first table and a second table of the database. This key can be used to, among other things, relate two or more documents in a hierarchical manner.

When a document is saved, data received in each live data field of the document is stored in the first and second tables of the database. Storing the data in these tables enables changes in the data received in one live data field of one document to produce like changes in the data received in other instances of the live data field within the one document and/or to produce like changes in the data received in other instances of the live data field in other documents related to the one document in a document hierarchy.

When a document is opened, data stored in a record of the first table and data stored in a record of the second table having the same key as the record of the first table are compared. If, for a particular live data field, the data is different, the user is given the option to retain in the live data field the data stored in the record of the second table, or to update the live data field with the data received in the record of the first table from another instance of the live data field in another document.

The user can create a new document from an existing document template which includes predetermined words, characters, symbols, and the like, and one or more predetermined live data fields. Alternatively, the user can enter words, characters, symbols, and the like into a blank document, insert live data fields into the document, and enter data into the live data fields of the document. If a new document is created from an existing template, the key of each live data field of the template is compared to the keys received in the second table to determine if an instance of the live data field already exists and if the instance of the live data field includes data. If a key exists in the document template and the second table, the data associated with the key in the second table is assigned to the live data field associated with the key. The same process is performed when a predefined clause that contains one or more live data fields is inserted into a document.

If a new live data field is created in the document, a related new field is automatically created in the database. The database stores data received in live data fields of a document by the level of the document in the document hierarchy. Once data has been entered into the database for a particular live data field and document level, the same data becomes available to all other documents in the document hierarchy. Once data is received in a live data field of any document in the document hierarchy, the data is used in each instance of the live data field within a document or is available for use in each instance of the live data field in documents within the document hierarchy. Preferably, the data may be formatted differently in different instances of the live data field within a document.

Completed documents that have data entered into live data fields thereof are stored in the database by document hierarchy. When a new document is opened in a document hierarchy, any data residing in the database for each instance of a live data field in the new document is automatically inserted into the appropriate instance of the live data field of the new document. If data is changed in the live data field of one document in the document hierarchy, and if one or more documents in the document hierarchy include an instance of the live data field, the data is automatically changed in each instance of the live data field in each document in the document hierarchy. Preferably, each document in the document hierarchy does not have to be opened at the same time. Rather, any changes in one document to data in one instance of a live data field referenced in multiple documents in the document hierarchy will be detected when another document in the document hierarchy is opened and the user has the option of approving a change in the data in each instance of the live data field in the other document.

BRIEF DESCRIPTION OF THE DRAWINGS

FIG. 1b is a block diagram of the software components forming the software stored in the computer system shown in FIG. 1a;

FIGS. 2a-2c are various tables, data structures and objects which are stored in the memory of the computer system shown in FIG. 1a;

FIGS. 3-6 are exemplary screen displays that are displayed on the monitor of the computer system shown in FIG. 1.

DETAILED DESCRIPTION OF THE INVENTION

The present invention will be described in connection with a word processor, particularly Microsoft® Word 97 SR-2, copyright 1983–1997 Microsoft Corporation (hereinafter "Word"). To this end, some of the features of Word are utilized to implement some aspects of the preferred embodiment of the invention described below. However, this is not to be construed as limiting the invention.

To avoid excessive complexity of description, the following description will exclude unnecessary details of how each feature is implemented, it being understood that such details would be known or readily derivable by one of ordinary skill in the art to which the present invention pertains.

Figure 1A:
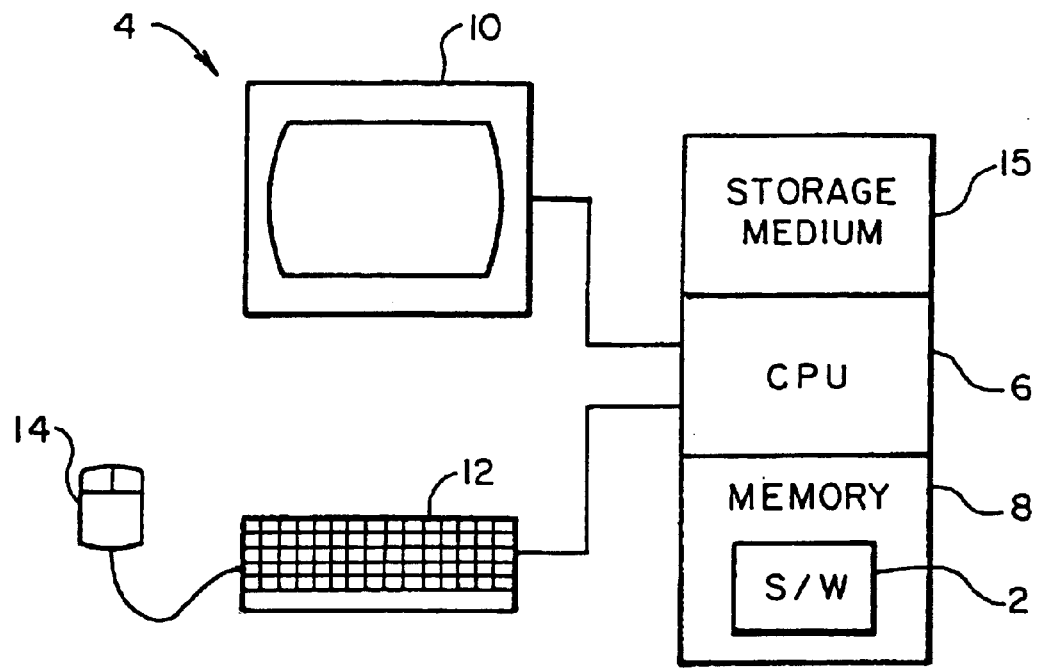
FIG. 1a is a schematic drawing of a conventional computer system utilized to implement the present invention.
Figure 1B:
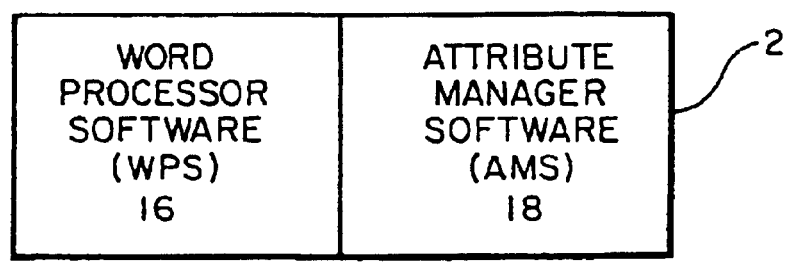

Referring now to FIGS. 1a and 1b, the present invention is implemented in computer software 2 which is installed on a conventional computer 4 which includes a central processing unit (CPU) 6, a memory 8, a monitor 10, a keyboard 12, a mouse 14, non-volatile storage medium 15 and other related hardware (not shown) known in the art. Computer software 2 includes conventional word processor software (WPS) 16, e.g., a version of Microsoft® Word, and an attribute manager software (AMS) 18. In operation, computer software 2 is installed in memory 8 in a manner known in the art and CPU 6 operates in accordance with computer software 2 to implement the present invention.

Figure 2A:
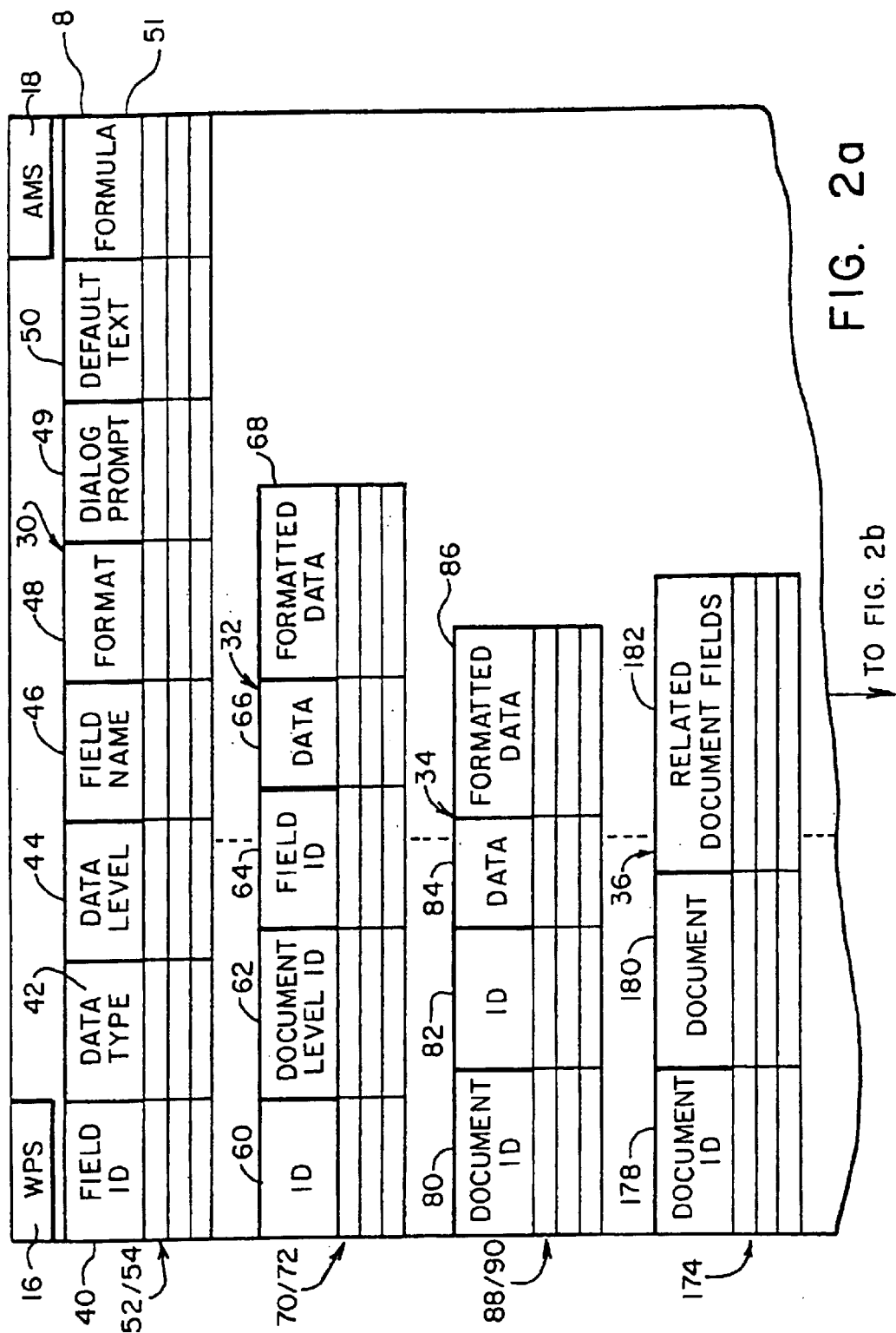
Figure 2B:
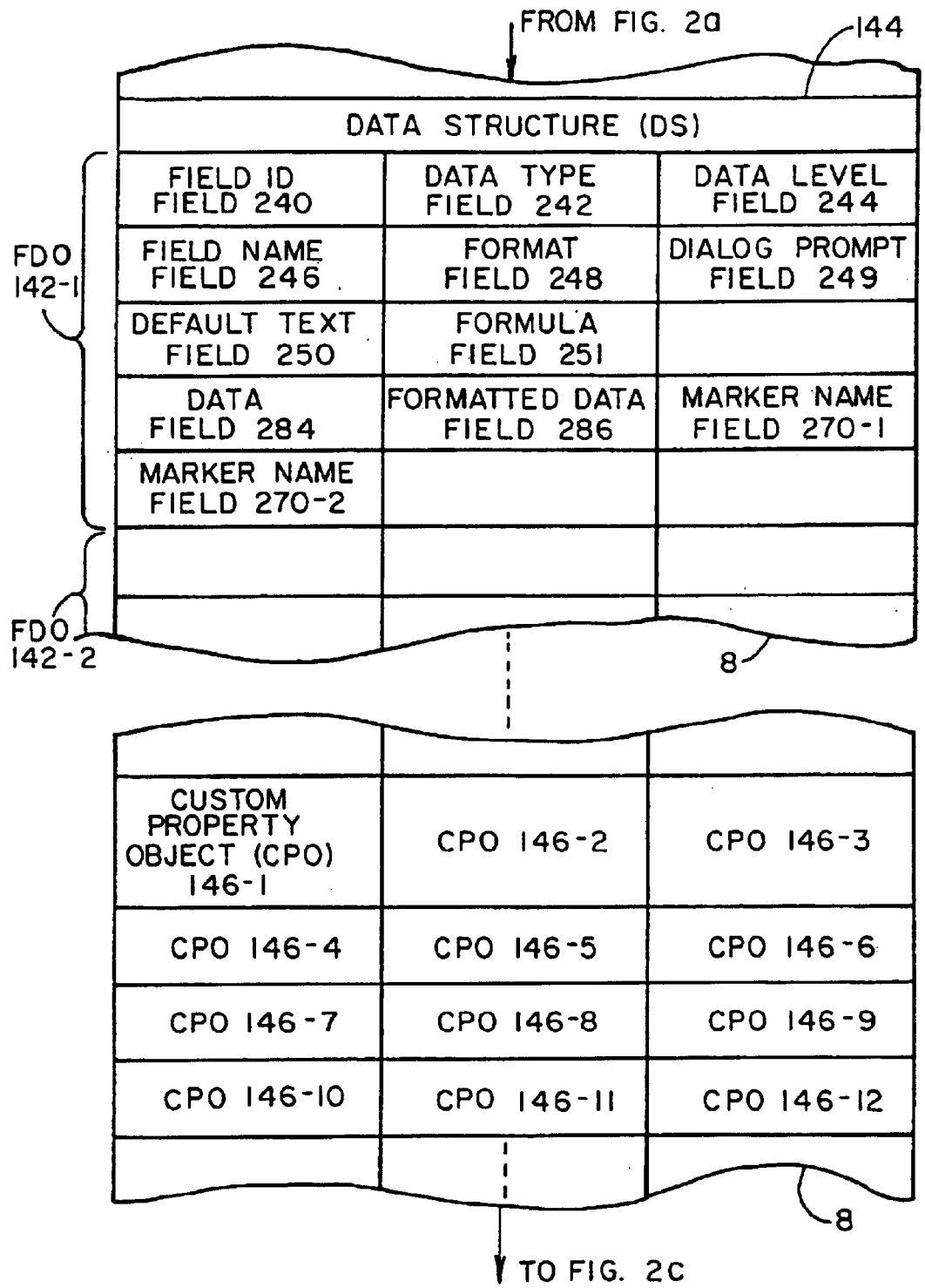
Figure 2C:
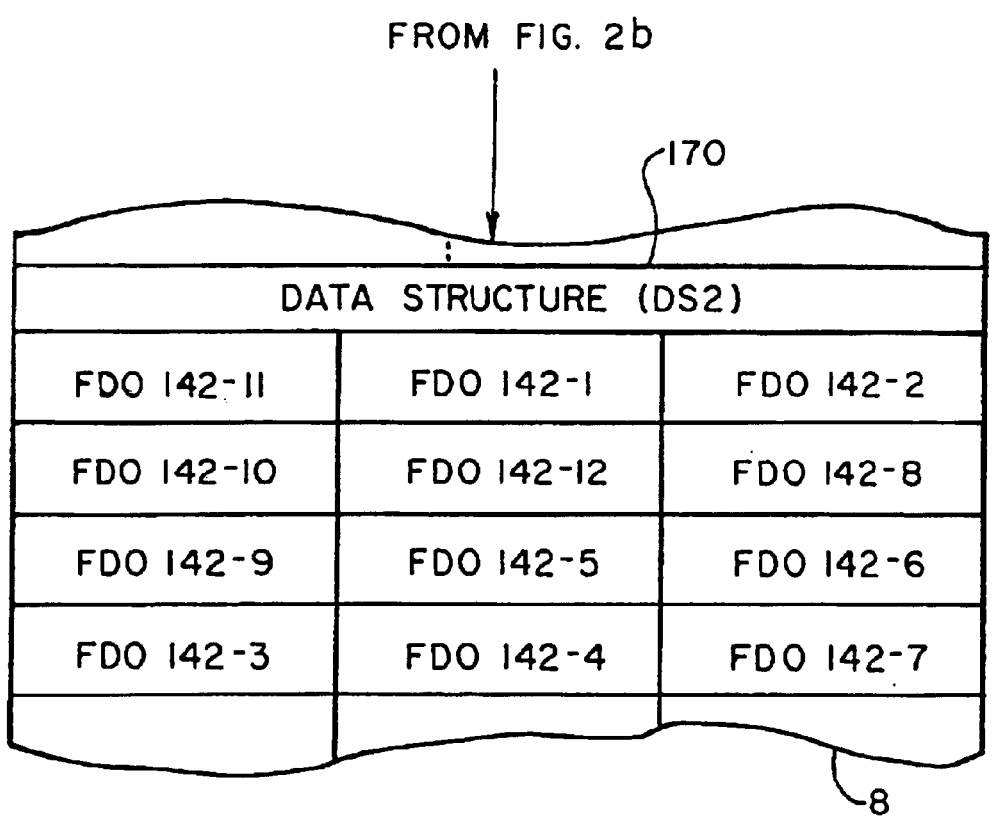

With reference to FIGS. 2a-2c and with continuing reference to FIGS. 1a and 1b, when computer software 2 is initialized in memory 8, WPS 16 commences operation in accordance with its programming and AMS 18 installs in memory 8 a first table 30, a second table 32, a third table 34 and a document table 36. Preferably, first table 30, second table 32, third table 34 and document table 36 are separate tables within a database. First table 30 includes a plurality of rows 52 each having a Field ID field 40, a Data Type field 42, a Data Level field 44, a Field Name field 46, a Format field 48, a Default Text field 50, and a Formula field 51. Each row 52 is configured to receive and retain a record 54 which includes fields 40–51 for receiving data unique to the record 54. Second table 32 includes a plurality of rows 70 each having an ID field 60, a Document Level (Client/Case) ID field 62, a Field ID field 64, a Data field 66, and a Formatted Data field 68. Each row 70 is configured to receive and retain a record 72 which includes fields 60–68 for receiving data unique to the record 72. Third table 34 includes a plurality of rows 88 each having a Document ID field 80, an ID field 82, a Data field 84, and a Formatted Data field 86. Each row 88 is configured to receive and retain a record 90 which includes fields 80–86 for receiving data unique to the record 90.

One or more records 54 in first table 30 are related to one or more records 72 in second table 32 by like data received in their respective Field ID fields 40 and 64. Similarly, one or more records 72 in second table 32 are related to one or more records 90 in third table 34 by like data received in their respective Field ID fields 60 and 82.

With reference to FIG. 3 and with continuing reference to all previous FIGS., next, a user of computer software 2 opens a document 96 in WPS 16. Document 96 can be formed from a document template that includes predetermined words, symbols and the like, and one or more live data fields, e.g., live data fields 138 and 139, or the user can enter words, symbols, and the like into a blank document 96 in a manner known in the art and insert one or more live data fields into blank document 96 at desired insert points, e.g., insert point 98, in document 96 where it is desired to enter data, e.g., a name, having one or more associated attributes or properties.

Figure 4:
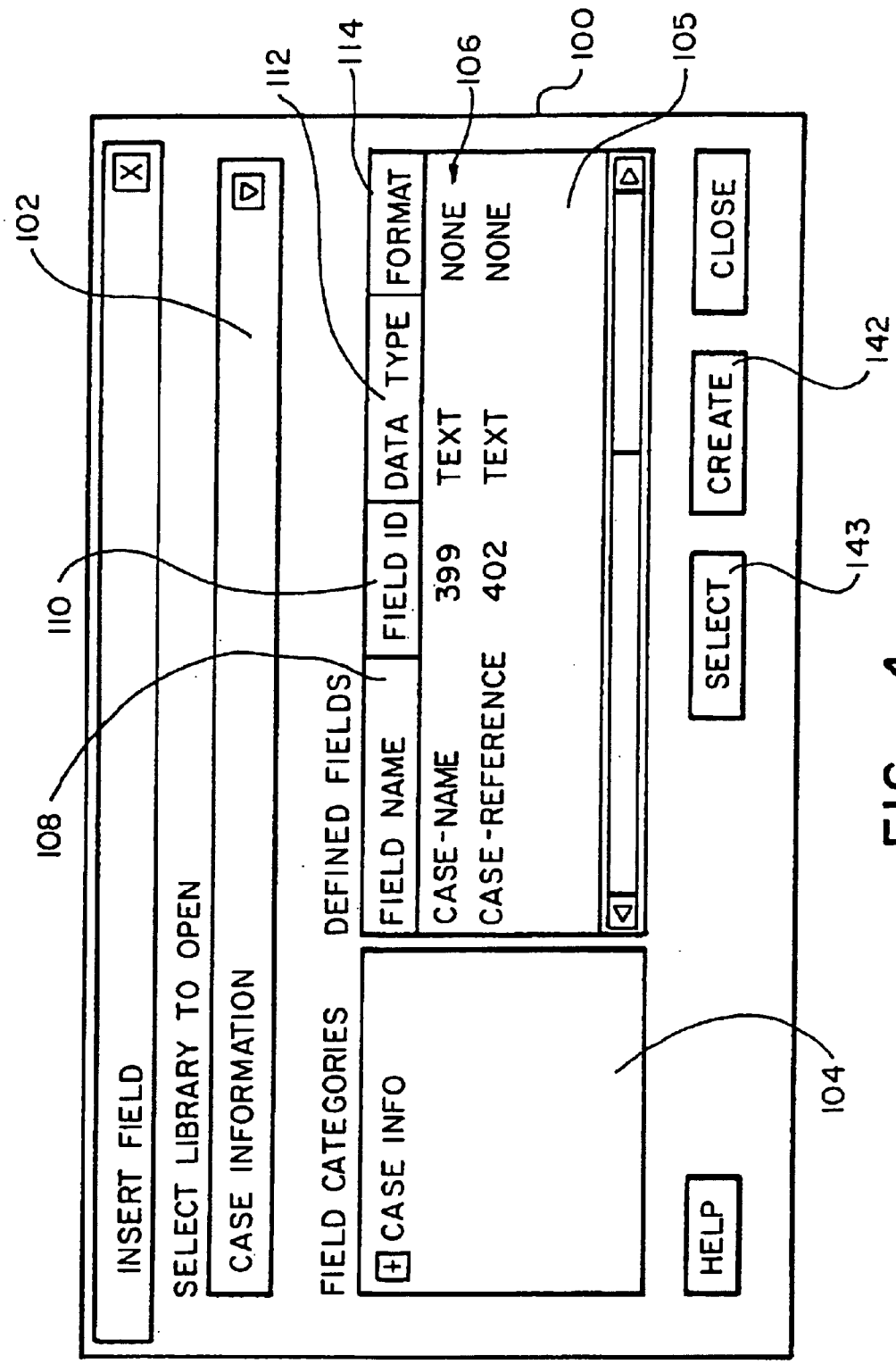

With reference to FIG. 4 and with continuing reference to all previous FIGS., for each live data field in document 96, the user causes an Insert Field dialog box 100 to be displayed on monitor 10. Insert Field dialog box includes a Select Library to open pull down menu 102, a Field Categories box 104 for displaying Field Categories related to the Library selected in pull down menu 102, and a Defined Fields box 105 for displaying records 106 of various fields that can be selected for association with a live data field, e.g., 138, of document 96. Each record 106 of box 105 includes a Field Name field 108 which displays the data received in Field Name field 46 of one of the records 54 of first table 30, a Field ID field 110 which displays the data received in Field ID field 40 of said one record 54 of first table 30, a Data Type field 112 which displays the data received in Data Type field 42 of said one record 54 of first table 30, and a Format field 114 which displays the data received in Format field 48 of said one record 54 of first table 30.

The data appearing in each record 106 of dialog box 100 shown in FIG. 4 is predetermined data which is received in corresponding fields of first table 30 when AMS 18 was created. However, a user can create a new record 106 for a particular live data field in Defined Fields box 105. This is accomplished by the user selecting a Create button 142 in Insert Field dialog box 100. In response to selecting Create button 142, AMS 18 causes the Field Properties dialog box 120 of FIG. 5 to be displayed on monitor 10.

Field Properties dialog box 120 includes, among other things, fields 122–130 for the user to enter data or make selections regarding a related Field Name, Data Type, Dialog Prompt, Format to be applied to the data to be received in a corresponding live data field and Default Text to appear in the live data field in the absence of data for the live data field, respectively. Data received in Field Name field 122 will be displayed in the related live data field, e.g., 139, once a field insertion process is complete unless data is received in the Default Text field 130, in which case data received in the Default Text field 130 will be displayed in the live data field.

Data Type field 124 includes a pull down menu which includes selections for text, number, multi-choice, multi-line, a calculated data type, and the like that the user can select to set the data type to be received in field 138. The choice of one of the selections of the pull down menu of Data Type field 124 enables AMS 18 to manage data received in the live data field in a manner consistent with its data type. Most of the selections of the pull down menu of Data Type field 124 are complete when the user chooses a particular selection. However, the user's choice of the calculated data type selection causes AMS 18 to display a Field Calculation dialog box (not shown) on monitor 10. The Field Calculation dialog box includes a Formula field (not shown) for receiving a formula that defines the data to be inserted into the corresponding live data field. Formulas that can be included in the formula field can include: a formula for calculating a date in advance, e.g., 30 days, of a date included as data in another live data field; a formula which merges together a first name, middle name and last name of an individual received in separate live data fields that may, or may not, appear in the document; a formula for selecting to apply a different format to data received in one instance of a live data field and entered into another instance of the live data field, and the like.

Format field 128 includes a pull down menu for selecting one of a plurality of predetermined formats that is to be applied to data received in the corresponding live data field.

Field Properties dialog box 120 also includes a Radio Button field 132 having a Client radio button 134 and a Case radio button 136 which can be selected by the user mutually exclusive of each other in a manner known in the art.

Once data entry and the selection of options from the various pull down menus in Field Properties dialog box 120 is complete, the user selects an OK button 140. In response to making this selection, AMS 18 closes Field Properties dialog box 120, and processes the various entries/selections received in Field Properties dialog box 120 to create in first table 30 a new record 54 that includes fields 42 and 46–50 for receiving the various entries/selections from the like named fields of Field Properties dialog box 120. In addition, the new record 54 includes Field ID field 40 for receiving a unique field ID assigned to new record 54 by AMS 18; a Data Level field 44 for receiving data corresponding to the selection of the Client radio button 134 or the Case radio button 136; and a Formula field 51 for receiving the formula entered into the Formula field of the Field Calculation dialog box. Thereafter, AMS 18 creates in Defined Fields box 105 of FIG. 4 a new record 106 that includes in each of fields 108, 110, 112 and 114 data received in respective fields 46, 40, 42 and 48 of the corresponding new record 54 created in first table 30.

After selecting one of the records 106 in Define Fields box 105, the user activates a Select button 143 in Insert Field dialog box 100. This activation causes AMS 18 to create for the selected record 106 a Field Data Object (FDO), e.g., 142-1, which is stored in a Data Structure (DS) 144 which was created in memory 8 by AMS 18 when a document is initialized in WPS 16. At the same time, AMS 18 creates in WPS 16 a Custom Property Object (CPO), e.g., 146-1, which is stored in memory 8 for use by WPS 16 in connection with document 96. CPOs are standard to Word and the present invention utilizes CPOs to associate data with one or more live data fields of document 96. FDO 142-1 includes fields 240–250 for received data from fields 40–50, respectively, of the record 54 of first table 30 that includes the same unique ID as FDO 142-1; a Formula field 251 for receiving the formula from Formula field 51 of the record 54 of first table 30; and fields 280 and 282 for receiving data from fields 80 and 82 of each record 90 related to a record 72 of second table 32 by like data received in their respective ID fields 82 and 60. Each live data field in document 96 is related to one FDO 142 stored in DS 144. Each FDO 142 stored in DS 144 essentially enables AMS 18 to retrieve and process data related to the unique ID associated therewith more efficiently than retrieving and processing data from the fields of first table 30 or second table 32. CPO 146-1 also includes the field ID that was received in Field ID field 40 of first table 30, and utilizes this field ID as a reference to the FDO 142 having the same field ID.

AMS 18 then creates a Marker Name for the live data field and stores the Marker Name in a Marker Name field 270 of FDO 142-1. Preferably, the Marker Name includes a unique prefix appended to the field ID received in the Field ID field 40 of the record 54 corresponding to FDO 142-1. AMS 18 then causes WPS 16 to create the actual live data field, e.g., 138, in document 96 and to assign to it CPO 146-1 which creates a link between the CPO 146-1 and live data field 138. Creation of this link is a standard Word function. Once this link is created, AMS 18 extracts from field 250 of FDO 142-1 data corresponding to the data received in Default Text field 50 of first table 30 and inserts this data in live data field 138. Absent data in field 50, AMS 18 extracts from field 246 of FDO 146-1 data corresponding to the data received in Field Name field 46 of first table 30 and inserts this data in live data field 138. Lastly, AMS 18 creates in document 96 a non-visual Bookmark 150, shown in phantom in FIG. 3, which is appended to the live data field 138 and which includes Marker Name and the location of live data field 138 in document 96. The foregoing procedure for creating an FDO 142 and CPO 146 is utilized for each unique live data field in document 96.

Preferably, each FDO 142 in DS 144 can reference two or more instances of a live data field in document 96. More specifically, each FDO 142 includes one or more Marker Name fields 270-1, 270-2, etc. for receiving Marker Names from different instances of a live data field in document 96. The Marker Names stored in each FDO 142 enable the FDO 142 to reference the live data fields having the same Marker Names in document 96.

If the same data is to be received in more than one instance of a live data field in document 96, the user selects the same record 106 in Insert Field dialog box 100 for each instance of the live data field to include said data. This selection causes the CPO 146 related to said data to reference each instance of the live data field in document 96, which creates a link between said data and each instance of the live data field in document 96. The ability of each CPO to have data reference two or more instances of a live data field in document 96 is a function of Word that the present invention utilizes.

Figure 6:
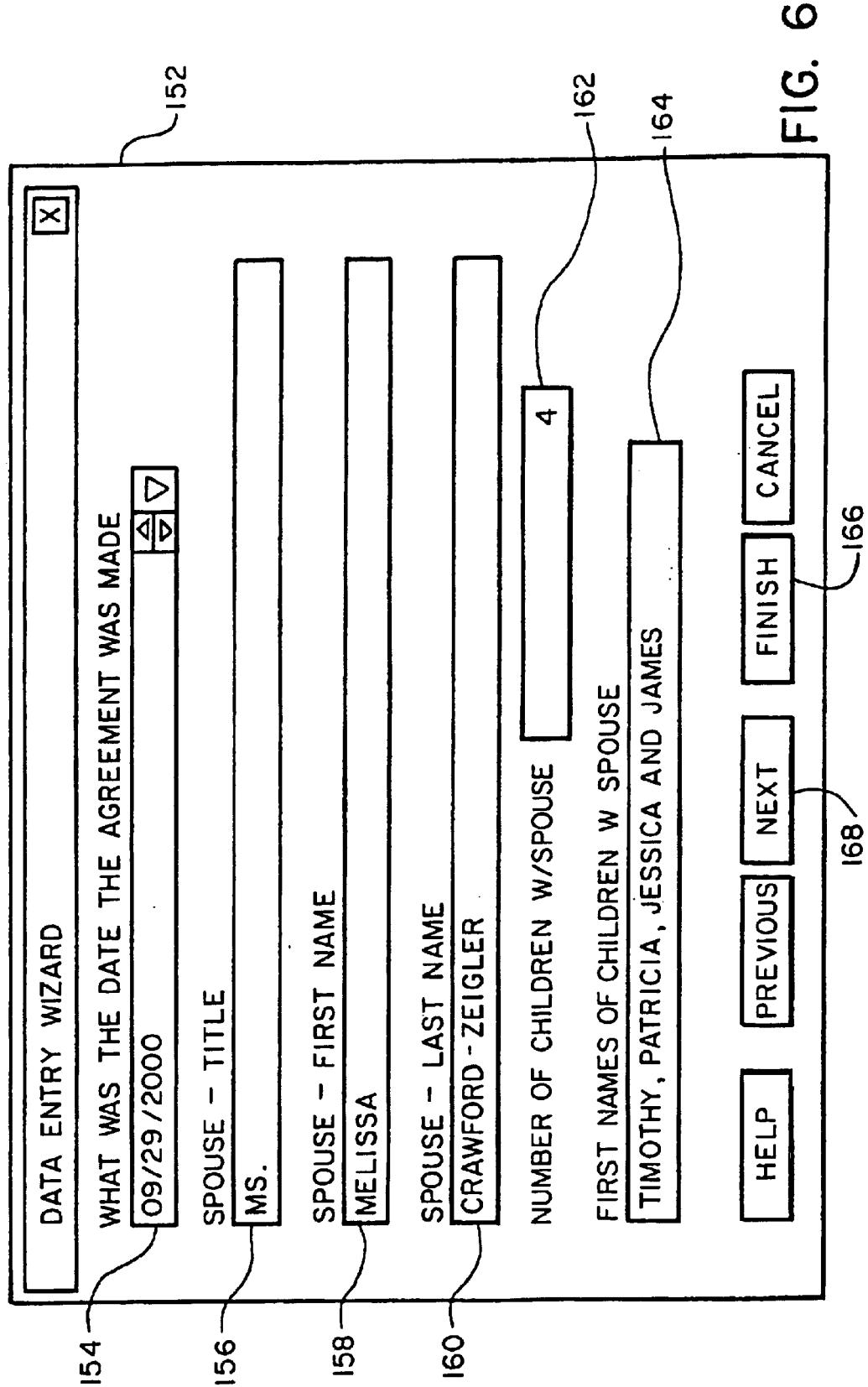

With reference to FIG. 6, the entry into a live data field, e.g., 138, of data having related attributes or properties will now be described. At a suitable time, the user causes AMS 18 to create in memory 8 a working copy of each FDO 142, e.g., 142-1–142-12, of DS 144 related to live data fields, e.g., fields 138 and 139, of document 96. AMS 18 then sorts the copied FDOs 142 into the same order as their respective live data fields appear in document 96, creates in memory 8 a second Data Structure (DS2) 170, copies the just sorted FDOs 142 into DS2 170, and adds to each copy of an FDO 142 in DS2 170 any required supporting fields (not shown) for receiving data utilized by the formula in Formula field 251 of the FDO 142 for calculating the data to be entered into the corresponding live data field of document 96.

Next, the user causes a Data Entry Wizard 152 to be displayed on monitor 10. Wizard 152 includes fields 154–164 related to FDOs 142-11, 142-1, 142-2, 142-10, 142-12, and 142-8, respectively, of DS2 170 for receiving data to be inserted into corresponding live data fields of document 98. In the present example, these fields 154–164 include the titles Agreement Date, Spouse's Title, Spouse's First Name, Spouse's Last Name, Number of Children with Spouse, and First Names of Children with Spouse, respectively. The title for each of fields 154–164 is extracted from the Dialog Prompt field 249 of the FDO 142 of the corresponding live data field of document 96.

When the user finishes entering data into the one or more fields 154–164, the user activates a Finish button 166 in Data Entry Wizard 152. If document 96 includes additional live data fields unrelated to fields 154–164 of Data Entry Wizard 152, one or more additional Data Entry Wizards (not shown) are displayed on monitor 10 for receiving data for the live data fields related to each of these additional Data Entry Wizards. Each additional Data Entry Wizard is displayed in response to the user activating a Next button 168 appearing in the preceding Data Entry Wizard.

Figure 5:
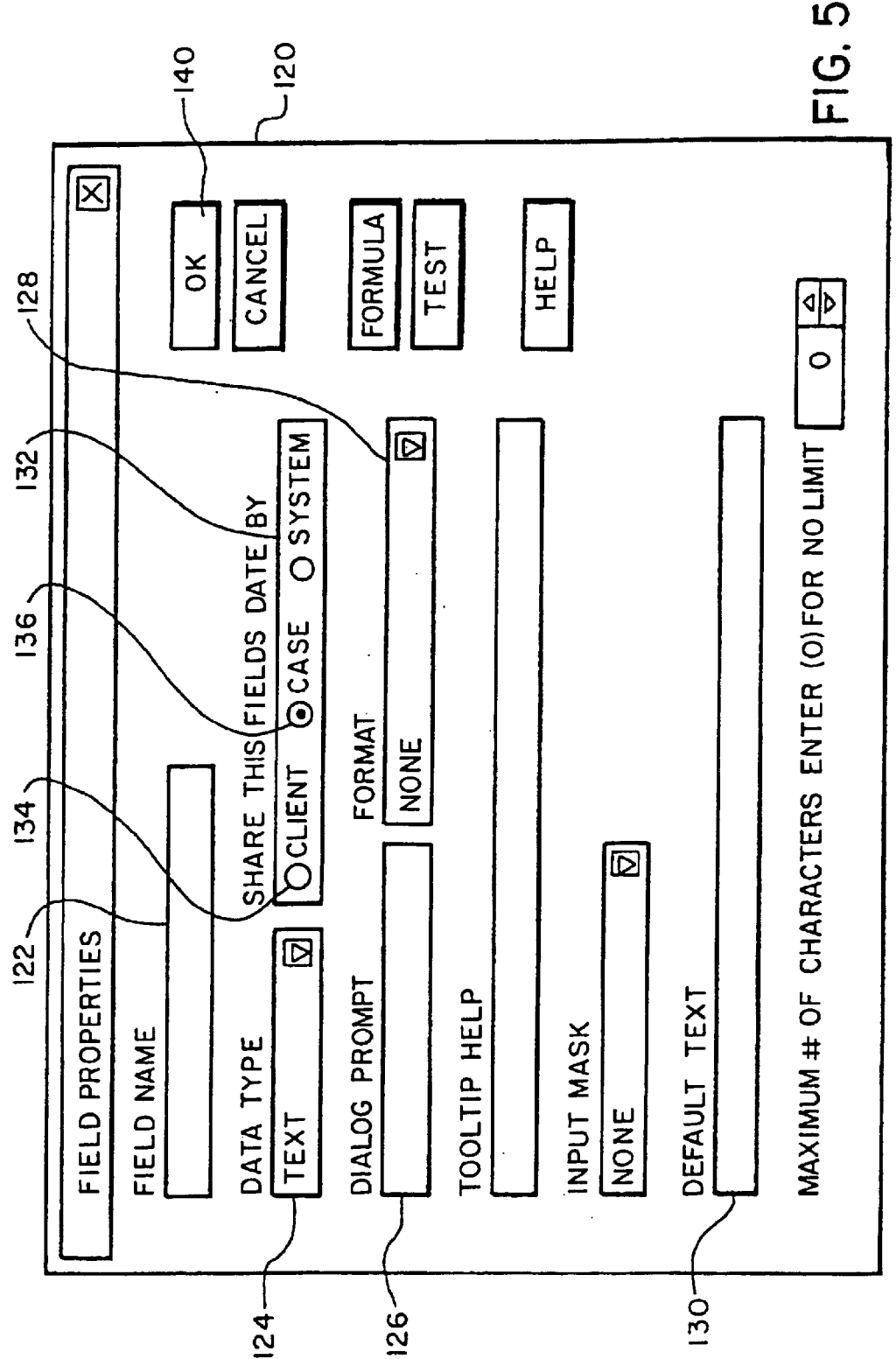

In response to activating Finish button 166, AMS 18 formats the data entered into each field 154–164 with the format selected in the Format field 128 of FIG. 5 related to each said field 154–164, even if the selected format is NONE. AMS 18 then saves the formatted data as new data in the appropriate fields of the corresponding record 72 of second table 32 or in the appropriate fields of the corresponding FDOs 142 of DS2 170. More specifically, if data entered into one or more of fields 154–164 or the formatted data for these one or more fields is to be displayed in document 96, the data received in each of these fields 154–164 and the formatted data therefor are saved as new data into appropriate fields of the corresponding FDOs 142 of DS2 170. However, if the data entered into one or more of fields 154–164 or the formatted data for these one or more fields is not to be displayed in document 96, the data received in each of these fields 154–164 and the formatted data therefor are saved as new data into appropriate fields, i.e. Data field 66 and Formatted Data field 68, of the corresponding record 72 of second table 32. This saving of data entered into fields 154–164 and formatted data for these fields is based on a match between the field ID received in the Field ID field 64 of each record 72 and the field ID received in the Field ID field 240 of each FDO 142 of DS2 170.

Once data is saved to a record 72 of second table 32 or to an FDO 142 of DS2 170 as new data, each formula received in a Formula field 251 of an FDO 142 of DS2 170 is executed and the results stored as new data in Formatted Data field 286 of the FDO 142. AMS 18 then updates the fields of each FDO 142 of DS 144 with any new data received in the corresponding fields of the corresponding FDO 142 of DS2 170 and sets a flag (not shown) in each FDO 142 of DS 144 if new data is received therein. Thereafter, AMS 18 deletes DS2 170.

AMS 18 then searches DS 144 to determine if a flag of each FDO 142 of DS 144 has been set. In response to detecting that a flag of an FDO 142 has been set, AMS 18 uses the field ID stored in the Field ID field 240 of the FDO 142 to locate the CPO 146 of WPS 16 having a matching field ID. Thereafter, AMS 18 copies to the CPO 146 having the matching field ID the new data stored in the Formatted Data field 286 of the corresponding FDO 142 of DS 144. AMS 18 then causes WPS 16 to execute a first Refresh function wherein WPS 16 inputs into each live data field, e.g., 138, of document 96 the new data received in the corresponding CPO 146 for the live data field. If any particular CPO references more than one live data field, WPS 16 inputs into each live data field referenced by said CPO the data copied into said CPO by AMS 18. If, prior to executing the Refresh function, one or more live data fields of document 96 did not contain data, the new data input into these one or more fields will represent the first entry of data thereinto.

Next, a second Refresh function will be described in connection with changing data in a field of document 96. Once document 96 has been created in the above-described manner, current data in one or more live data fields, e.g., field 138, of document 96 can be changed by overtyping the current data with new data, or by deleting the current data and inserting new data. In order to detect whether data has changed in one or more live data fields of document 96, AMS 18 extracts the Marker Name from the Bookmark 150 for each live data field of document 96 and compares each extracted Marker Name to each Marker Name stored in each FDO 142 of DS 144. If a match between Marker Names is detected, AMS 18 compares the data in the live data field of document 96 to the data stored in Data field 284 of the corresponding FDO 142. If the data is different, AMS 18 updates the data stored in Data field 284 of the FDO 142 and updates the data stored in the related CPO 146 with the data from the corresponding live data field of document 96. If the data matches, no changes are made to the data stored in the Data field 284 of the FDO 142 or the related CPO 146. Lastly, AMS 18 causes WPS 16 to execute the first Refresh function whereby live data fields of document 96 which are supposed to include the same data as the live data field that just received new data are updated with the new data stored in the CPO 146 which references said live data fields.

If the user deletes from document 96 a live data field, e.g., 138, and said live data field's Bookmark, e.g., 150, AMS 18 deletes the FDO 142 for said live data field from DS 144. More specifically, AMS 18 determines if each Marker Name of each FDO 142 stored in DS 144 for document 96 has a corresponding Marker Name appearing in a Bookmark 150 appended to a live data field of document 96. If an FDO 142 of DS 144 includes a Marker Name that does not appear in a Bookmark 150 appended to a live data field of document 96, AMS 18 deletes the Marker Name from the FDO 142. When all Marker Names have been removed from an FDO 142, the FDO 142 and the corresponding CPO 146 are deleted. If, however, an FDO 142 includes a Marker Name that appears in a Bookmark 150 appended to a live data field of document 96, no further steps are taken.

Next, a process for saving data received in the live data fields of document 96 will be described. At a suitable time, the user executes a Save command from a menu (not shown) of AMS 18. In response to executing the Save command, AMS 18 executes the second Refresh process described above and opens document table 36 in memory 8. Document table 36 is preferably a database file that includes a record 174 for each document created using AMS 18. Each record 174 includes a Document ID field 178 for storing the name assigned to the document by the user, a Document field 180 for storing the document itself, and Related Document fields, generally shown as 182, for receiving information generated by WPS 16 regarding the document being saved, such as author, date and time the document is being saved, and the like. Once the Document table 36 is open, AMS 18 stores in the record 174 the document being saved along with the above mentioned information.

AMS 18 then opens second table 32 and third table 34 and determines if DS 144 includes an FDO 142 for each record 72 in second table 32. This determination is based on a comparison of the field ID included in each FDO to the corresponding field ID received in the Field ID field 64 of each record 72 of second table 32. For each record 72 of second table 32 not having a corresponding FDO 142 in DS 144, AMS 18 compares the data received in the ID field 60 of each said record 72 to the data received in the ID field 82 of the records 90 of third table 34. If a match is detected between the data received in an ID field 82 of one of the records 90 of third table 34 and the data received in the ID field 60 of one of the records 72 of second table 32 not having a corresponding FDO 142 in DS 144, AMS 18 deletes this record 90 from third table 34.

Next, for each record 72 of second table 32 having a corresponding FDO 142 in DS 144, AMS 18 updates the data in the Data field 66 and Formatted Data field 68 of each record 72 with data from the Data field 284 and Formatted Data field 286 of the corresponding FDO 142. Next, AMS 18 copies into the Document Level ID field 62 of each record 72 the data received in the Document Level ID field 262 of the corresponding FDO 142 of DS 144 related to the selection of the Client radio button 134 or the Case radio button 136. The selection of radio button 134 or 136 is also stored in the Data Level field 44 of the corresponding record 54 of first table 30. Based on a match between the data received in the ID field 60 of each record 72 of second table 32 and the data received in the ID field 82 of each record 90 of third table 34, AMS 18 then updates Data field 84 and Formatted Data field 86 of each record 90 of third table 34 with like data received in Data field 284 and Formatted Data field 286, respectively, of the corresponding FDO 142 of DS 144. AMS 18 also stores in the Document ID field 80 of each record 90 the document name selected by the user in WPS 16 in connection with said record 90. Lastly, AMS 18 saves tables 30–36 to storage medium 15.

From a more general perspective, first table 30 is utilized to store records 54 that include data related to attributes or properties of each live data field of documents created utilizing AMS 18, second table 32 is utilized to store records 72 that include data related to the fields of documents created utilizing AMS 18 based on the data received in the document level ID fields 62 of each record 72, and third table 34 is utilized to store records 90 that include data related to the fields of documents created utilizing AMS 18 based on the name of the document stored in the Document ID field 80 of each record 90. In order to understand how tables 30–34 are utilized, assume that AMS 18 creates two documents, each having ten fields and each having five fields that are shared with the other document. These two documents will result in third table 34 having twenty records 90, one for each field in each document; and first table 30 and second table 32 each having fifteen records 72, one for each unique field in both documents.

Lastly, the opening of a document previously stored in storage medium 15 will be described. Starting with computer software 2 initialized in memory 8 and with no documents installed in WPS 16, a user selects a document for opening. In response to this selection, AMS 18 retrieves the document from Document Table 36 and installs the retrieved document into WPS 16. AMS 18 then initializes DS 144 in memory and opens tables 30–34. Next, based upon a match between the name of the document retrieved from memory 8 and the data, i.e. the name of the document in the Document ID field 80 of each record 72 of the third table 34, AMS 18 determines which records 72 of third table 34 are related to the retrieved document. Then, based on a match between the data received in ID fields 60 and 82 of the second and third tables 32 and 34, respectively, and a match between the data received in Field ID fields 40 and 64 of the first and second tables 30 and 32, respectively, AMS determines which records 54 and 72 of first and second tables 30 and 32, respectively, are related to the retrieved document.

AMS 18 then creates in DS 144 an FDO 142 for each field in the document and copies into corresponding fields of each FDO 142 the data received in fields 40–51 of first table 30, and fields 84 and 86 of third table 34 of records 54 and 90, respectively, related to the FDO 142. Next, AMS 18 compares the data received in Data field 280 of an FDO 142 to the data received in Data field 66 of each record 72 of second table 32 related to the FDO 142. If the data is the same, AMS 18 takes no action. However, if the data is different, the user is prompted to select which data, i.e. the data from Data field 66, the data from Data field 84, or text, to format and insert into the corresponding live field of the document. AMS 18 then includes the formatted data inserted into each live data field of the document into Formatted Data field 286 of the FDO 142 related to the live data field and into Formatted Data field 68 or 86 of a related record 72 or 90 of second or third table 32 or 34, respectively, based on the user's selection. AMS 18 also copies the Marker Name for each live data field into appropriate Marker Name field 270 of the FDO 142 related to the live data field. Lastly, AMS 18 assigns to the CPO 146 that references each live data field of the document the data received in the corresponding FDO 142.

Figure 7:
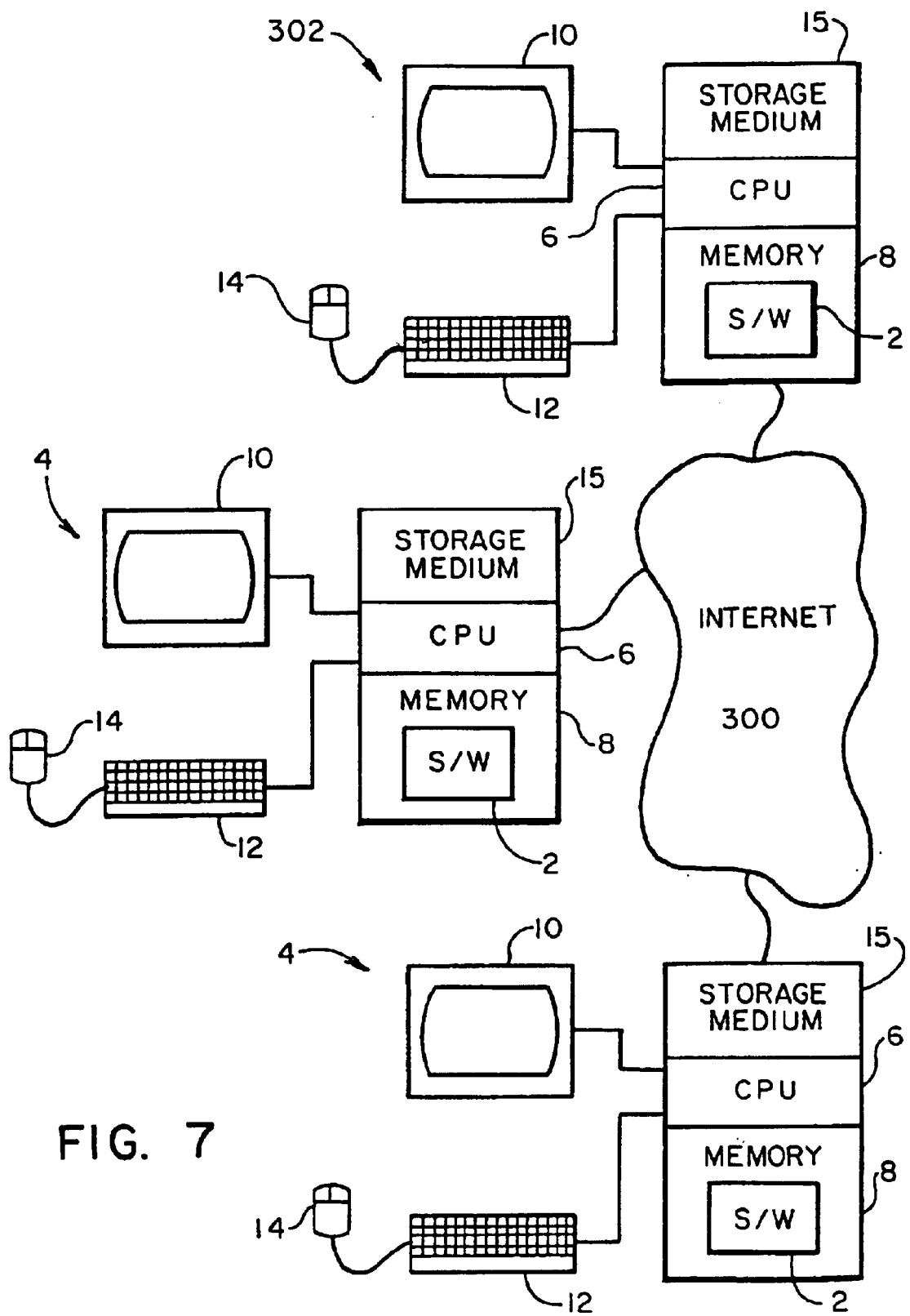
FIG. 7 is a schematic drawing of a server computer connected to coact with a plurality of conventional computer systems via the Internet to implement the present invention.

As can be seen, the present invention enables live data fields to be entered into standard word processing documents. Each of these live data fields includes a record stored in at least one table. These records enable attributes or properties of the data received in each live data field to be stored and used to effect changes to two or more instances of the live data field in one or more documents when a change is made in the data in one instance of the live data field. In the above-described preferred embodiment of the present invention, each attribute or property is expressed as data received in one or more fields of one or more records of the at least one table, which data is used to create the necessary relationships between plural instances of a particular live data field in one or more document. However, the number of fields, the number of records, and/or the number of tables utilized are not to be construed as limiting the invention. With reference to FIG. 7, one or more computers 4 can be connected to a server computer 302 via the Internet 300. Server computer 320 can store computer software 2 for use by each computer 4 via the Internet 300 or for download to each computer 4 for use thereat via the Internet 300. Computer software 2, tables 30–36, DS 144, DS2 170 and/or each CPO 146 can reside in memory 8 of server computer 302 for use by one of computers 4 via Internet 300, can be downloaded to the one computer 4 from server computer 302 via Internet 300, or can be distributed between server computer 302 and one of the computers 4 connected together via the Internet 300. The selection to retain computer software 2 and/or any of tables 30–36, DS 144, DS2 170 and/or (CPO) 146 in memory 8 of server computer 302, or to transfer one or more of computer software 2, tables 30–36, DS 144, DS2 170 and/or CPO 146 to memory 8 of one of the computers 4 via Internet 300 can be based upon, among other things, a desired operating speed of computer software 2 to the user of the one computer 4 and/or for security reasons.

The invention has been described with reference to the preferred embodiments. Obvious modifications and alterations will occur to those of ordinary skill in the art upon reading and understanding the preceding detailed description. It is intended that the invention be construed as including all such modifications and alterations insofar as they come within the scope of the appended claims or the equivalents thereof.

We claim:

1. A computer implemented method of assembling a document comprising the steps of:
   (a) initializing or opening in a memory of a computer a document having at least one live data field;
   (b) initializing a record in the memory for each live data field, each record storing an attribute or property of data received in the corresponding live data field;

(c) inserting data into a first live data field or amending data in the first live data field; and (d) inserting data into a second live data field or amending the data in second live data field to include the data inserted into or amended in the first live data field based on the attributes or properties of the data stored in the records of the first and second live data fields.

2. The method as set forth in claim 1, wherein the first and second data fields are in the same document.

3. The method as set forth in claim 1, wherein:

the memory includes at least one record for each of a plurality of documents; and the first and second live data fields are in different documents.

4. The method as set forth in claim 1, wherein the records of the first and second live data fields include a common attribute or property of the data.

* * * * *